United States Patent [19]

Lind

[11] Patent Number: 4,740,358

[45] Date of Patent: Apr. 26, 1988

[54] GERMICIDAL BARRIER

[75] Inventor: Björn Lind, Billdal, Sweden

[73] Assignee: Aktiebolaget SKF, Gothenburg, Sweden

[21] Appl. No.: 917,199

[22] Filed: Oct. 9, 1986

[30] Foreign Application Priority Data

Dec. 11, 1985 [SE] Sweden ................................ 8505846

[51] Int. Cl.[4] .......................... A61L 2/00; F16J 15/50; F16J 15/54

[52] U.S. Cl. ........................................ 422/305; 422/4; 422/38; 277/3; 277/22; 277/27; 277/89

[58] Field of Search .......................... 277/3, 22, 27, 89; 422/1, 4, 38, 305

[56] References Cited

U.S. PATENT DOCUMENTS 1,451,225 4/1923 Krause .................................. 277/22
1,795,932 3/1931 Cornell, Jr. ........................... 277/22
3,269,735 8/1966 Whittaker ............................. 277/22
3,299,905 1/1967 Smirra .................................. 277/22
4,360,207 11/1982 Rappange et al. ..................... 277/22
4,613,141 9/1987 Heinen .................................. 277/27

FOREIGN PATENT DOCUMENTS 7609594 1/1984 Sweden .

*Primary Examiner*—David L. Lacey
*Assistant Examiner*—Floyd E. Bennett, Jr.
*Attorney, Agent, or Firm*—Eugene E. Renz, Jr.

[57] ABSTRACT

A device for disinfecting the gap between two relatively movable elements such as a shaft and housing wherein a gap is defined by those elements and the gap contains a gaseous medium which is heated by an adjacent heating loop to provide a germicidal barrier in the gap.

2 Claims, 1 Drawing Sheet

1
9
3
4
6
5
2
7

GERMICIDAL BARRIER

FIELD OF THE INVENTION

This invention relates to a device for disinfecting a gap between two elements which are movable with respect to each other. Examples of such elements are a shaft at a housing having a gap there between.

BACKGROUND OF THE INVENTION

There are many processes in which machines having parts which are movable with respect to each other are used. For example, many are used in the food and drug industry. In conjunction with these devices, sealing problems may occur especially where shafts pass through walls in containers. This problem is particularly manifest when there is an excess of pressure over atmospheric pressure in the machines. In this situation, there is a risk that matter present in the machines would be pressed out into the environment through various bearings and the seals. This escape of matter through the bearings and seals may contaminate the environment with microbes which might be used in the process.

In practice, it is impossible to obtain a perfect seal between two elements which are relatively moving with respect to each other. One proposed suggestion is that an inert medium be pressed into the gap between two relatively movable surfaces, so that the pressure of the medium in the gap is higher than the pressure in the matter which is contained in the vessel and which is thus being prevented from leaking through that gap. The use of such a seal would give rise to only small friction losses, but the method would not absolutely guarantee that microbes would be prevented from passing through the gap. Particularly, this is a concern when the pressure in the inner medium which has been placed in the gap decreases or ceases to exist. It is also not acceptable to employ a chemical germicidal agent in the gap, since such would be placed in the space where the process is taking place. The process then would be adversely affected by the presence of a chemical germicidal agent.

It is known such as by SE-B-7609594 to supply steam to a sealing device, for example, for a shaft passing through a wall, so that the high temperature of the steam acts as a germicidal agent. This arrangement is comparatively expensive and complicated, since steam conduits, condensers and return conduits, etc are needed to complete the arrangement.

Accordingly, it is an object of the present invention to provide an arrangement for disinfecting a gap between two elements which are movable with respect to each other. The object is to provide such an arrangement which is simple and compact, as well as being inexpensive to install and operate.

SUMMARY OF THE INVENTION

It has now been discovered that the above and other objects of the present invention may be accomplished in the following manner. Specifically, it has been discovered that an effective device for disinfecting a gap between two elements which are movable with respect to each other may be provided in the following manner. Specifically, the device comprises a pair of elements which are movable in relationship to each other and thereby define a gap between the two elements. A gaseous medium is provided in the gap, either from the ambient atmosphere or by means of a gaseous supply means. A heat emitting loop is placed in or adjacent to the gap in heat exchange contact with the gaseous medium contained in the gap so as to heat the gaseous medium to provide a germicidal barrier in the gap. A preferred use for such a device would be in the passage of a shaft through a wall in a container such as a pharmaceutical separator or the like.

BRIEF DESCRIPTION OF THE DRAWINGS

These and other objects of the present invention and the various features and details of the operation and construction thereof are hereinafter more fully set forth with reference to the accompanying drawings, wherein.

DETAILED DESCRIPTION OF THE PREFERRED EMBODIMENT

Figure 1:
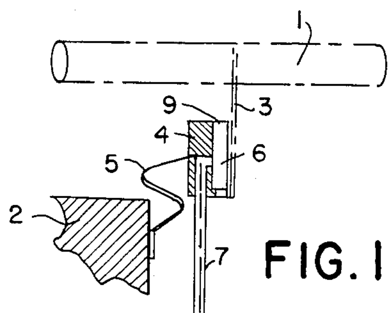
FIG. 1 is a section view showing one embodiment of the present invention.

As shown in FIG. 1, a rotatable shaft 1 is located in operational relationship with a housing 2. The shaft is arranged through a bore in the housing and the gap between the shaft 1 and the housing 2 is sealed off by providing the shaft with a disk 3 and providing the housing 2 with a ring 4 such that the disk 3 and ring 4 have surfaces facing one another. The ring 4 is connected to the housing 2 by means of an annular resilient member 5 which surrounds the shaft 1. The gap between the shaft 1 and the housing 2 is thus limited by the opposing surfaces on the disk 3 and the ring 4. All of the elements adjacent this gap are made of heat resistent material. Means are provided for heating, at least a portion of that gap. The disk 3 may be made of a ceramic material and the surface of the ring 4 facing the disk 3 may be provided with a chamber 6 which contains a gas permeable material such as a sintered compound. A gas then can be brought into the chamber 6 via a conduit 7 and thereafter be pumped into the gap between the disk 3 and the ring 4. The amount of gas flowing out of that gap per unit time is, of course, relatively small.

A specific heatable body is to be placed in one of the surfaces which defines the gap, either the disk 3 or the ring 4. As shown in FIG. 1, the heatable body is formed by a loop 9 which is inserted into the ring 4 at one rim of the gap between the disk 3 and the ring 4. The gas which is heated to a high temperature by heating loop 9 then flows out the other rim of the gap between the ring 4 and the disk 3.

Figure 2:
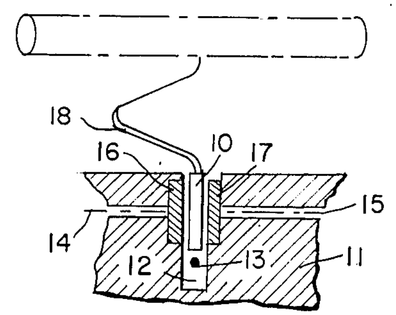
FIG. 2 is a longitudinal section of another embodiment shown, applied to a rotatable disk.

As shown in FIG. 2, a gap may be situated between a rotating disk 10 and a member 11 which surrounds the disk and which is provided with an annular recess 12 in which the peripheral or outer portion of the disk 10 is inserted. Placement of a heating body 13 of annular shape is accomplished in the recess 12 between the peripheral of the disk 10 and the radially outer limiting surfaces of the recess 12. This disk 10 may be supported at one or both sides by a gas layer. Gas may be supplied through conduits 14 or 15 to a gas permeable bearing layers 16 or 17. The disk 10 is placed between these two gas permeable bearing layers. The disk 10 is connected to a rotating shaft through a resilient member 18, whereby the shaft may be permitted to move axially.

Figure 3:
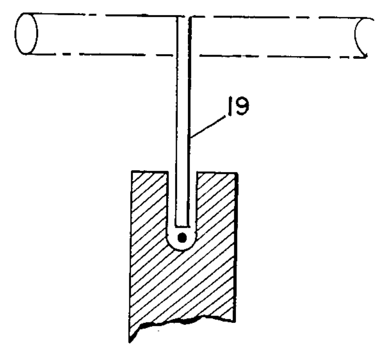
FIG. 3 is a longitudinal section of a simplified version of the present invention without an external gas supply.

The device shown in FIG. 3 does not have an external gas supply. Disk 19 is shown rotating about a shaft. If the gaps on both sides of disk 19 are of different size, that differential will cause a flow of fluid in the desired direction even when there is no pressure differential between the fluids located on both sides of disk 19.

Figure 4:
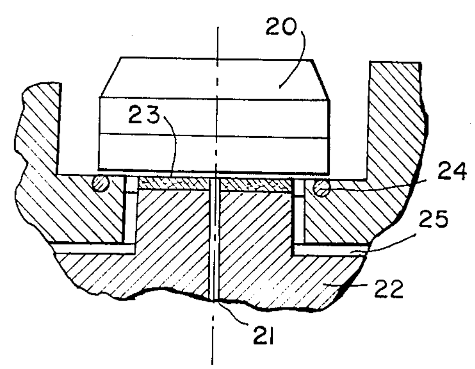
FIG. 4 is a longitudinal section of a rotar supported by a gas bearing employing the principles of this invention.

As shown in FIG. 4, a rotor 20 is supported by a gas bearing having pressurized gas supplied through conduit 21 into bearing 22. As can be seen, a gap exists between the opposing flat surface on rotor 20 and the element 22 during operation of the device. A layer 23 of gap permeable material is arranged on element 22 and located in the gap between the element 22 and the rotor surface 20. Pressurized gas is then fed through conduit 21 to the gaps between the permeable layer 23 and the rotor 20. A heatable element 24 is placed in the gap on element 22, so as to enclose the layer 23. If desired, the element 22 may also have outlet channels 25 for the gas supply on the gas bearing. The flat surfaces of element 22, between the layer 23 and the heat loop 24 may have a flat surface so that the gas which flows out of the gas bearing will not cool the hot loop 24 when the device is in operation.

Having thus described the invention, what is claimed is:

1. In a device including a housing, a shaft in rotating relationship with said housing, and a gap between said shaft and said housing, the improvement comprising:

a disk mounted on said shaft and a ring flexibly supported on said housing to thereby define a narrow gap between said shaft and said housing;

gas supply means communicating with said narrow gap to bring a gaseous medium therein; and a heat emitting loop in or adjacent said narrow gap and positioned to contact said gaseous medium from said supply means to heat said gaseous medium to provide a germicidal barrier in said narrow gap.

2. The device of claim 1, wherein said ring includes a gas permeable material in communication with said gas supply means and having a face adjacent said disk in said narrow gap.

* * * * *